United States Patent
Akino et al.

(10) Patent No.: US 12,543,698 B2
(45) Date of Patent: Feb. 10, 2026

(54) LITTER FOR SYSTEM LITTER BOX AND METHOD FOR MANUFACTURING SAME

(71) Applicant: UNICHARM CORPORATION, Ehime (JP)

(72) Inventors: Yasuhiro Akino, Kagawa (JP); Hiroki Yamamoto, Kagawa (JP)

(73) Assignee: Unicharm Corporation, Ehime (JP)

( * ) Notice: Subject to any disclaimer, the term of this patent is extended or adjusted under 35 U.S.C. 154(b) by 0 days.

(21) Appl. No.: 18/650,498

(22) Filed: Apr. 30, 2024

(65) Prior Publication Data

US 2024/0276947 A1    Aug. 22, 2024

Related U.S. Application Data

(63) Continuation of application No. PCT/JP2022/040772, filed on Oct. 31, 2022.

(30) Foreign Application Priority Data

Nov. 12, 2021 (JP) ................................. 2021-185137

(51) Int. Cl.
  *A01K 1/015*  (2006.01)
  *A01K 1/01*   (2006.01)

(52) U.S. Cl.
  CPC .......... *A01K 1/0154* (2013.01); *A01K 1/0107* (2013.01)

(58) Field of Classification Search
  CPC .................................................. A01K 1/0154
  See application file for complete search history.

(56) References Cited

U.S. PATENT DOCUMENTS

| | | | |
|---|---|---|---|
| 5,664,523 | A | 9/1997 | Ochi et al. |
| 2009/0013936 | A1 | 1/2009 | Yamamoto et al. |
| 2009/0211532 | A1 | 8/2009 | Matsuo et al. |
| 2011/0017143 | A1 | 1/2011 | Matsuo et al. |
| 2015/0048538 | A1 | 2/2015 | Sogou et al. |
| 2015/0075439 | A1 | 3/2015 | Sogou et al. |
| 2016/0262341 | A1 | 9/2016 | Sogou |
| 2018/0110200 | A1* | 4/2018 | Sogou .................. A01K 1/0154 |
| 2024/0276947 | A1 | 8/2024 | Akino et al. |

FOREIGN PATENT DOCUMENTS

| | | | |
|---|---|---|---|
| CN | 106577314 A | | 4/2017 |
| CN | 113331062 A | | 9/2021 |
| CN | 113598071 A | * | 11/2021 |
| EP | 3075240 A1 | * | 10/2016 ........... A01K 1/0114 |

(Continued)

OTHER PUBLICATIONS

OFT Corporation, "PeeWee series" have been released.; URL: https://oftww.com/newsrelease/newitem/peewee_news; Aug. 4, 2020 (12 pages).

(Continued)

*Primary Examiner* — Joshua D Huson
*Assistant Examiner* — Alanna K Peterson
(74) *Attorney, Agent, or Firm* — Osha Bergman Watanabe & Burton LLP

(57) ABSTRACT

Litter for a system litter box includes granular matters each having a granule diameter equal to or smaller than 6.0 mm. A proportion of the granular matters, having any smaller one of a granule diameter and a granule length of less than 3.2 mm, is equal to or less than 6%.

12 Claims, 3 Drawing Sheets

(56) References Cited

FOREIGN PATENT DOCUMENTS

| | | | |
|---|---|---|---|
| FR | 3017772 A1 * | 8/2015 | ........... A01K 1/0155 |
| JP | H07327536 A | 12/1995 | |
| JP | 2004-008003 A | 1/2004 | |
| JP | 2006204249 A | 8/2006 | |
| JP | 2006345830 A | 12/2006 | |
| JP | 2008193938 A | 8/2008 | |
| JP | 2009-125000 A | 6/2009 | |
| JP | 2013-202038 A | 10/2013 | |
| JP | 2015-100310 A | 6/2015 | |
| JP | 2015-133932 A | 7/2015 | |
| JP | 2017079622 A | 5/2017 | |
| JP | 2019-180332 A | 10/2019 | |
| JP | 2020141587 A | 9/2020 | |
| JP | 2021141847 A | 9/2021 | |
| JP | 7747924 B2 | 10/2025 | |

OTHER PUBLICATIONS

Ise-Miyachu, "Shintoya-san's cat litter—Wood white pellets (short length) 20kg"; URL: https://web.archive.org/web/20201201121007/https://www.ise-miyachu.net/SHOP/kn-ptzmjk-nk-20kg.html; Dec. 1, 2020 (16 pages).

Deo toilet <URL:http://web.archive.org/web/20210620035856/https://jp.unicharmpet.com/ja/deotoilet/home.html >, Jun. 20, 2021 (14 pages).

* cited by examiner

LITTER FOR SYSTEM LITTER BOX AND METHOD FOR MANUFACTURING SAME

BACKGROUND

Technical Field

The present invention relates to litter for a system litter box and a method of producing the same.

Discussion of the Background

A system litter box is known as a litter box for animals such as cats and dogs. In the system litter box, litter for a system litter box (hereinafter also simply referred to as "litter") is used. For example, Patent Literature 1 discloses a system litter box for animals and litter for animals. The litter for animals includes a plurality of granular matters. Each of the plurality of granular matters includes a core part including an inorganic porous material and a binder that integrally fixes the inorganic porous material; and a water-cut-off coating layer formed on a surface of the core part and including a water-cut-off material having water absorption and having viscosity in the water-absorbed state. The system litter box for animals includes an upper container having a plurality of hole parts in a bottom surface part and having litter for animals laid thereon; and a lower container having a liquid absorbent member laid thereon. Among these, the bottom surface part of the upper container having a plurality of hole parts (through holes) has a portion formed in the shape of a duckboard. Therefore, in the following description, the portion formed in the duckboard shape will also be referred to as a duckboard portion.

PATENT LITERATURE

Patent Literature 1: Japanese Patent Publication No. 2015-100310

SUMMARY

It is known that cats are originally creatures living in deserts. According to the studies of the present inventors, it was first revealed that cats can naturally excrete on sand or on sand-like objects having a small granule size, from the remnants of living on sand; however, even if the cats are on the sand-like objects, if the granule size is large, they will not want to excrete perhaps because they recognize the objects as a stone or rock instead of sand and feel a sense of discomfort with the objects.

Therefore, in a case where the granule size of litter in a system litter box is large, there is a risk that cats do not enter the system litter box or do not excrete even after entering the system litter box. In such a case, the health of the cats is impaired or the cats excrete in an unexpected place, causing an additional burden on the owners for cleaning.

On the other hand, in 95% or more of system litter boxes that are popular in the world, the opening width of each of a plurality of hole parts in a duckboard portion is 2.3 to 2.7 mm. Therefore, in a case where the granule size of the litter is small, there is a risk that the litter is fitted into the hole part, causing clogging, or that the litter falls downward from the hole part. In a case where the litter is clogged, urine accumulates in the duckboard portion, or old litter that has been fitted into the duckboard portion is less likely to be removed in cleaning of the system litter box. In addition, in a case where the litter falls downward through the hole part, the original function of the litter cannot be performed.

In this manner, in a case where the granule size of the litter is large, there is a risk that cats do not excrete in the system litter box, and in a case where the granule size of the litter is small, there is a risk that the litter may be clogged in a plurality of hole parts of the duckboard portion of the system litter box.

One or more embodiments provide litter which makes it possible for cats to easily excrete in a system litter box and can also suppress the generation of clogging of the litter in a plurality of hole parts of a duckboard portion of the system litter box and a method of producing the same.

An aspect of one or more embodiments is litter for a system litter box, which is used in a system litter box, the litter comprising a plurality of granular matters, wherein each of the plurality of granular matters has a granule diameter of 6.0 mm or less, and a proportion of the granular matters having any smaller one of a granule diameter or a granule length of less than 3.2 mm in the plurality of granular matters is 6% or less.

Another aspect of one or more embodiments is a system litter box kit comprising a system litter box; the above litter for a system litter box; and an excrement treatment sheet.

A further aspect of one or more embodiments is a method of producing litter for a system litter box, which is used in a system litter box, the litter including a plurality of first granular matters, the method comprising a forming step of forming a plurality of second granular matters; and an acquiring step of removing the second granular matters having a predetermined size from the plurality of second granular matters to acquire the plurality of first granular matters, wherein a granule diameter of each of the plurality of first granular matters is 6.0 mm or less, and a proportion of the granular matters having any smaller one of a granule diameter or a granule length of less than 3.2 mm in the plurality of first granular matters is 6% or less.

According to one or more embodiments, litter which makes it possible for cats to easily excrete in a system litter box and can also suppress the generation of clogging of litter in a plurality of hole parts of a duckboard portion of the system litter box and a method of producing the same can be provided.

DESCRIPTION OF THE EMBODIMENTS

Figure 1:
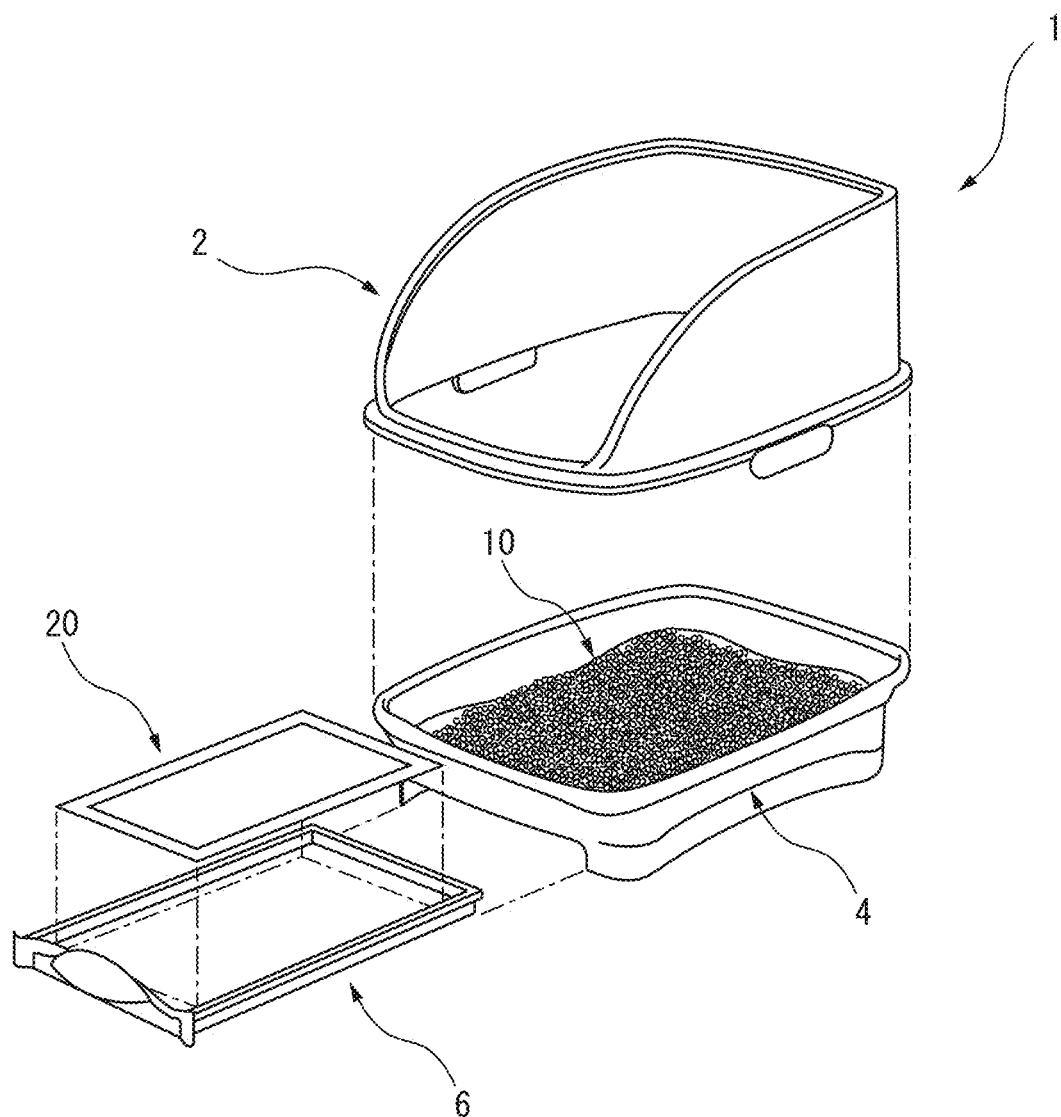
FIG. 1 is a perspective view showing a configuration of a system litter box using litter according to one or more embodiments.

One or more embodiments relate to the following aspects.

Aspect 1

Litter for a system litter box, which is used in a system litter box, the litter comprising a plurality of granular matters, wherein each of the plurality of granular matters has a granule diameter of 6.0 mm or less, and a proportion of the granular matters having any smaller one of a granule diameter and a granule length of less than 3.2 mm in the plurality of granular matters is 6% or less.

According to the studies conducted by the inventors, cats can naturally excrete on sand or on sand-like objects having a small granule size. Therefore, it can be said that the cats are accustomed to excreting on sand or on sand-like objects having a small granule size (hereinafter also referred to as "high accustomization"). However, it can be said that cats are not accustomed to excreting on sand-like objects having a large granule size since they do not want to excrete on sand-like objects having a large granule size (hereinafter also referred to as "low accustomization").

Thus, in the present litter for a system litter box, since the granule diameter of each of a plurality of granular matters is a small value of 6.0 mm or less, the size of each of a plurality of granular matters is set to provide high accustomization for cats. Therefore, the system litter box using the present litter for a system litter box can make it easy for cats to excrete. At the same time, in the present litter for a system litter box, a proportion of the granular matters having any smaller one of the granule diameter and the granule length of less than 3.2 mm in the plurality of granular matters is a small value of 6% or less (the unit is % by number). Therefore, the size of each of the plurality of granular matters is substantially larger than the size (for example, the opening width: 2.3 to 2.7 mm) of each of a plurality of hole parts (through holes) in a duckboard portion of the system litter box. Due to that, in the system litter box using the litter for a system litter box, the litter for a system litter box can be less likely to be fitted into the plurality of hole parts of the duckboard portion. This makes it possible for the cats to appropriately excrete in the system litter box, and can also suppress the clogging of the litter for a system litter box in the plurality of hole parts in the duckboard portion of the system litter box.

Aspect 2

The litter for a system litter box as described in Aspect 1, wherein a proportion of the granular matters having a granule length of 3.5 to 10 mm in the plurality of granular matters is 85% or more. In the present litter for a system litter box, the size of the plurality of granular matters is set to a size of approximately (85% by number or more) 10 mm or less. That is, the plurality of granular matters include almost no large granular matter and are set to a size to provide high accustomization for cats. Due to that, the system litter box using the present litter for a system litter box can make it easier for cats to excrete. At the same time, the size of the plurality of granular matters is set to a size of approximately (85% by number or more) 3.5 mm or more. That is, the plurality of granular matters include almost no small granular matter and are set to a size larger than the plurality of hole parts of the duckboard portion of the system litter box. Due to that, in the system litter box using the litter for a system litter box, the litter for a system litter box is even less likely to be fitted into the plurality of hole parts of the duckboard portion.

Aspect 3

The litter for a system litter box as described in Aspect 1 or 2, wherein an apparent specific gravity of the plurality of granular matters is 1.00 to 1.50 g/cm$^3$.

In the present litter for a system litter box, the apparent specific gravity of the plurality of granular matters is 1.00 to 1.50 g/cm$^3$, which is a value that is close to the apparent specific gravity of sand and provides high accustomization for cats. Due to that, the system litter box using the present litter for a system litter box can make it easier for cats to excrete. In addition, the apparent specific gravity is high, which can make it less likely for the present litter for a system litter box to scatter outside the system litter box. Therefore, this makes it easier for cats to appropriately excrete in the system litter box and the surroundings of the system litter box can be maintained in a sanitary state.

Aspect 4

The litter for a system litter box as described in any one of Aspects 1 to 3, wherein a proportion of the granular matters having a mass per granule of 0.065 g or more in the plurality of granular matters is 55% or more.

In the present litter for a system litter box, since the proportion of the granular matters having a mass of 0.065 g or more per granule in the plurality of granular matters is a high value of 55% or more (the unit is % by number), the mass of the granular matters is close to the mass of sand, leading to a value to provide high accustomization for cats. Due to that, the system litter box using the present litter for a system litter box can make it easier for cats to excrete. In addition, the mass per granule is large, which can make it less likely for the present litter for a system litter box to scatter outside the system litter box. Therefore, this makes it easier for cats to appropriately excrete in the system litter box and the surroundings of the system litter box can be maintained in a sanitary state.

Aspect 5

The litter for a system litter box as described in any one of Aspects 1 to 4, wherein a gap rate between the granular matters in the plurality of granular matters is 45% by volume or less.

In the present litter for a system litter box, since the gap rate between the granular matters in the plurality of granular matters is a small vale of 45% by volume or less to decrease the gaps, subduction when a cat steps on the litter is small. Thus, the feeling of the litter is close to that of sand, leading to a state providing high accustomization for cats. Due to that, the system litter box using the present litter for a system litter box can make it easier for cats to excrete. In addition, since the gaps are small, the plurality of granular matters is less likely to move relative to each other. This can prevent a situation where the granular matters move relative to each other and thus fill the gaps to prevent urine from moving downward through the gaps. Due to that, a situation where excrement accumulates between the granular matters, and urine odor and feces odor become strong can be prevented.

Aspect 6

The litter for a system litter box as described in any one of Aspects 1 to 5, wherein an angle of repose in the plurality of granular matters is 50 degrees or less.

In the present litter for a system litter box, since the angle of repose in the plurality of granular matters is a small value of 50 degrees or less, subduction of the litter for a system toilet when a cat steps on the litter is small. Thus, the feeling of the litter is close to that of sand, leading to a state providing high accustomization for cats. Due to that, the system litter box using the present litter for a system litter box can make it easier for cats to excrete. In addition, the decrease in angle of repose makes it possible to easily cover the entire feces with the granular matters and to suppress the dispersion of the feces odor.

Aspect 7

The litter for a system litter box as described in any one of Aspects 1 to 6, wherein the plurality of granular matters include an odor-adsorbing material.

In the present litter for a system litter box, since an odor-adsorbing material is included in the plurality of granular matters, the diffusion of urine odor and feces odor is suppressed. Thus, the litter is brought close to the original state of sand without excrement or an odor thereof even in a case where the litter is used for a long period of time, thus, maintaining the state providing high accustomization for cats. Due to that, the system litter box using the present litter for a system litter box can make it easier for cats to excrete.

Aspect 8

The litter for a system litter box of Aspect 7, wherein the odor-adsorbing material includes an inorganic porous material.

In the present litter for a system litter box, since an inorganic porous material is included in the odor-adsorbing material, the composition of the granular matters is close to the composition of sand, thus leading to a state providing high accustomization for cats. Due to that, the system litter box using the present litter for a system litter box can make it easier for cats to excrete.

Aspect 9

The litter for a system litter box as described in any one of Aspects 1 to 8, wherein a water absorption ratio in the plurality of granular matters is less than 160%.

In the present litter for a system litter box, since the water absorption ratio of the plurality of granular matters is a small value of less than 160%, the granular matters are suppressed from swelling by absorbing urine and the deviation from the state of the sand is suppressed. Thus, a state providing high accustomization for cats can be maintained. Due to that, the system litter box using the present litter for a system litter box can make it easier for cats to excrete. In addition, since the water absorption ratio is low, it is possible to prevent a situation where the granular matters retain urine and the urine generates a bad odor or a harmful substance due to an influence of microorganisms or the like even in a case where the present litter for a system litter box is used for a long period of time.

Aspect 10

The litter for a system litter box as described in any one of Aspects 1 to 9, wherein a disintegrability in each of the plurality of granular matters is less than 0.5 mL.

In the present litter for a system litter box, since the disintegrability of each of the plurality of granular matters is less than 0.5 mL, the granular matters can be less likely to disintegrate after absorbing urine. Thus, the granular matters can be suppressed from disintegrating and thus, being fitted into a plurality of hole parts in the duckboard portion of the system litter box.

Aspect 11

A system litter box kit comprising a system litter box; the litter for a system litter box as described in any one of Aspects 1 to 10; and an excrement treatment sheet.

Since the litter for a system litter box as described in any one of Aspects 1 to 10 is laid out in a system litter box which is obtained by assembling the present system litter box kit, the above-described effects that can be exerted by the litter for a system litter box can be achieved.

Aspect 12

A method of producing litter for a system litter box, which is used in a system litter box, the litter including a plurality of first granular matters, the method comprising: a forming step of forming a plurality of second granular matters; and an acquiring step of removing the second granular matters having a predetermined size from the plurality of second granular matters to acquire the plurality of first granular matters, wherein a granule diameter of each of the plurality of first granular matters is 6.0 mm or less, and a proportion of granular matters having any smaller one of a granule diameter or a granule length of less than 3.2 mm in the plurality of first granular matters is 6% or less.

The litter for a system litter box produced by the present method of producing a litter for a system litter box, which is used in a system litter box, can achieve the same effects as the litter for a system litter box described in Aspect 1.

Hereinafter, litter for a system litter box (hereinafter also simply referred to as "litter") and a method of producing the same according to embodiments will be described.

FIG. 1 is a perspective view showing a configuration of a system litter box 1 using litter according to one or more embodiments. The system litter box 1 includes an upper container 4 having a plurality of hole parts on the bottom surface part and having litter 10 laid on the bottom surface part; and a lower container 6 arranged below the upper container 4 and having an excrement treatment sheet 20 arranged thereon. The bottom surface part of the upper container 4 has a porous structure or mesh-like structure having a plurality of hole parts (through holes). The structure has a function of permeating liquid excrement (for example, urine) (of removing moisture), that is, a function of a duckboard. Thus, the bottom surface part is also hereinafter referred to as a duckboard portion. The configuration of the bottom surface part, that is, the duckboard portion will be described later. Furthermore, it should be noted that in one or more embodiments, the system litter box 1 further includes a cover 2 that is arranged above the upper container 4, limits the access opening for animals, and suppresses the scattering of the excrement or the litter 10.

The system litter box 1 is configured so that liquid excrement (for example, urine) excreted from an animal (for example, a cat) passes through the litter 10 without being almost absorbed by the litter 10, and is absorbed and retained in an excrement treatment sheet 20 located below the litter 10. Therefore, immediately after excrement of the animal, the excrement and an odor thereof can be absorbed by the excrement treatment sheet 20, making it possible to suppress a malodor as well as to suppress the diffusion of the malodor by the litter 10. In addition, in the system litter box 1, the litter 10 does not absorb excrement to form a solidified mass, making it possible to reduce the frequency of replacement of the litter 10, as compared with the litter including absorbent granules in the related art. Further, even in a case where the animal performs a sand scraping action after excrement, it is less likely for the excrement to adhere to the legs of the animal. Further, in the system litter box 1, the bottom surface part of the upper container 4 in which the litter 10 is laid and the excrement treatment sheet 20 are arranged apart from each other. Therefore, even in a case where the animal rides on the litter 10 after excrement, the excrement treatment sheet 20 is not subjected to a load due to the body weight of the animal, and thus, there is an advantage that a backflow of the excrement absorbed by the excrement treatment sheet 20 is not likely to occur.

The system litter box 1, the litter 10, and the excrement treatment sheet 20 can be combined together into a system litter box kit including these. Since the litter 10 is laid out in the system litter box 1 which is obtained by assembling the present system litter box kit, the effects of the litter 10 which will be described later can be achieved.

Figure 2:
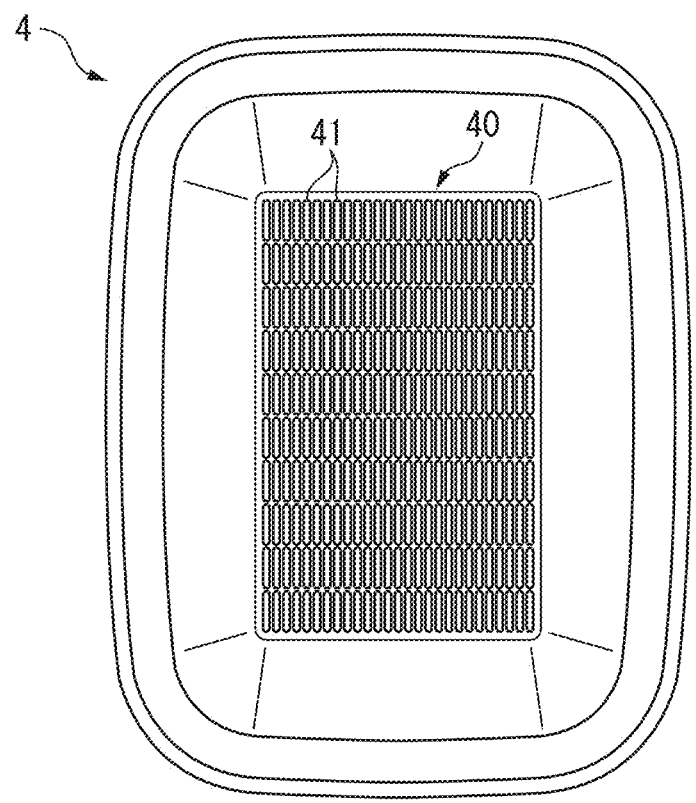
FIG. 2 is a plan view showing a configuration of an upper container of the system litter box of FIG. 1.
Figure 3:
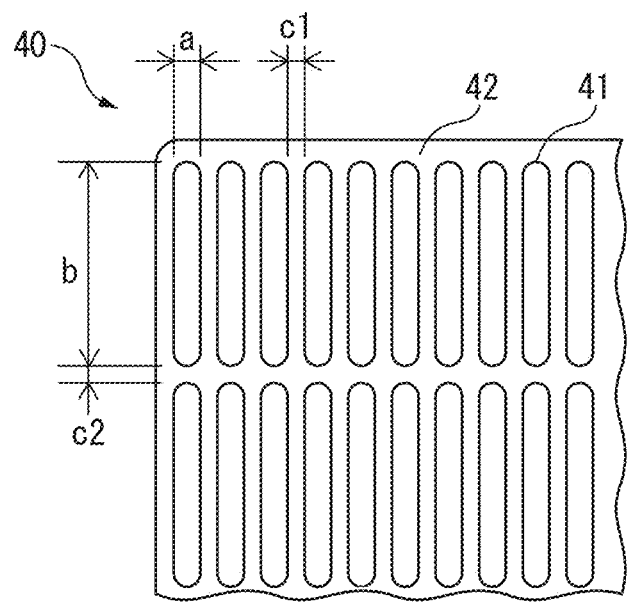
FIG. 3 is a partial plan view showing a configuration of a bottom surface part of the upper container of FIG. 2.

FIG. 2 is a plan view showing the configuration of the upper container 4 of the system litter box 1 in FIG. 1, and FIG. 3 is a partial plan view showing the configuration of the bottom surface part 40 (duckboard portion) of the upper container 4 in FIG. 2. The bottom surface part 40 includes a base part 42 and a plurality of hole parts 41 provided in the base part 42. In one or more embodiments, the base part 42 has a substantially rectangular thin plate shape in a plan view. The hole part 41 has a shape of a rectangle (long side (length) b×short side (width) a; the short side is a semicircular arc) that is long in the longitudinal direction in a plan view. In one or more embodiments, the length b is 10 to 30 mm, the width a is 2.3 to 2.7 mm, and the gaps c1 and c2 are 1 to 3 mm. The plurality of hole parts 41 are arranged in the base part 42 in a grid-like manner at gaps c1 in the transverse direction and at gaps c2 in the longitudinal direction in a plan view. In one or more embodiments, the bottom surface part 40 is a duckboard portion formed in a shape of a duckboard having the plurality of hole parts 41. It should be noted that the shape of the base part 42 in a plan view is not limited to this example and other shapes (for example, circular, elliptical, and polygonal shapes) may be used. In addition, the shape of the hole part 41 in a plan view is not limited to this example and other shapes (for example, circular, elliptical, and rhombic shapes) may be used. Furthermore, the arrangement of the plurality of hole parts 41 in a plan view is not limited to this example, and other arrangements (examples: zigzag arrangement) may be used.

Figure 4:
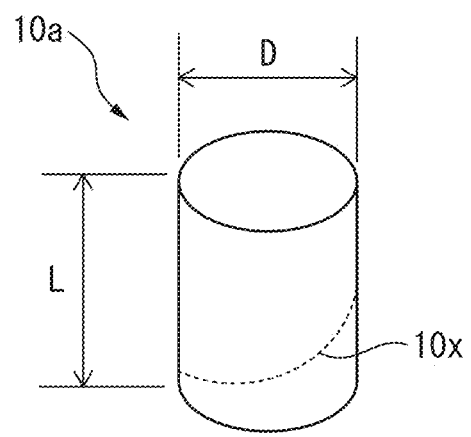
FIG. 4 is a perspective view schematically showing a configuration of granular matters of litter according to one or more embodiments.

FIG. 4 is a perspective view schematically showing a configuration of granular matters 10a of litter 10 according to one or more embodiments. The litter 10 includes a plurality of granular matters 10a. In one or more embodiments, the granular matters 10a have a cylindrical shape (granule diameter D of the bottom surface×granule length L). It should be noted that in the granular matters 10a, there may be a deformation on the side surface or the bottom surface, for example, a breakage at the broken line 10x indicated by a broken line, due to an impact during production or transportation, or the like, and therefore, it may not be strictly said that the granular matters 10a have a cylindrical shape. In such a case, the shape of the granular matters 10a is regarded as a cylindrical shape capable of containing the granular matters 10a in a minimum volume. It should be noted that the shape of the granular matters 10a is not limited to this example and may have other shapes (for example, a sphere, an ellipsoid, and a polyhedron). Even in that case, the following description of the granular matters 10a can be applied by considering the shape of the granular matters 10a as a cylindrical shape capable of containing the granular matters 10a in a minimum volume.

Each of the plurality of granular matters 10a has a granule diameter D of 6.0 mm or less. Thus, a proportion (by number) of the granular matters having any smaller one of the granule diameter D and the granule length L of less than 3.2 mm in the plurality of granular matters 10a is 6% or less.

According to the studies conducted by the inventors, cats can naturally excrete on sand or on sand-like objects having a small granule size, and thus, it can be said that the cats are accustomed to excreting on sand or on sand-like objects having a small granule diameter (hereinafter also referred to as "high accustomization"). However, it can be said that cats are not accustomed to excreting on sand-like objects having a large granule size since they do not want to excrete on sand-like objects having a large granule diameter (hereinafter also referred to as "low accustomization"). Thus, in the litter 10 for a system litter box, the size is set to a size providing high accustomization for cats by decreasing the granule diameter of each of a plurality of granular matters 10a to 6.0 mm or less. Therefore, the system litter box 1 using the litter 10 can make it easy for cats to excrete. It should be noted that, with regard to the accustomization, it is considered that cats make judgements by a tactile feel, a smell, and the like sensed by their feet and the like.

On the other hand, according to the studies conducted by the inventors, it was revealed that in a case where the width of the hole part in the duckboard portion is 2.3 to 2.7 mm, the granular matters can be suppressed from being fitted into the hole part or falling off from the hole part by setting any smaller one of the granule diameter and the granule length to 3.2 mm or more (at least about 115% or more with respect to the width of the hole part). Therefore, in the litter 10, the proportion of the granular matters having any smaller one of the granule diameter D and the granule length L of less than 3.2 mm in the plurality of granular matters 10a is decreased to 6% (by number) or less. That is, the size of most of the plurality of granular matters 10a is made larger than the size of each of the plurality of hole parts 41 of the bottom surface part 40 (duckboard portion) of the system litter box 1. Therefore, in the system litter box 1 using the litter 10, the granular matters 10a of the litter 10 can be less likely to be fitted into the plurality of hole parts 41 of the duckboard portion (bottom surface part 40). In this manner, the litter 10 can make it possible for the cats to appropriately excrete thereon in the system litter box 1, and can suppress the clogging of the litter 10 in the plurality of hole parts 41 in the duckboard portion (bottom surface part 40) of the system litter box 1.

From the viewpoint of obtaining the effects, the proportion (by number) of the granular matters 10a having any smaller one of the granule diameter D and the granule length L of less than 3.2 mm in the plurality of granular matters 10a may be 3% or less, or may be 1% or less.

It should be noted that, the proportion (by number) of the granular matters 10a having any larger one of the granule diameter D or the granule length L of less than 3.5 mm may be 6% or less, or may be 3% or less. In this manner, as the proportion of the number of the granular matters having any larger one of the granule diameter D or the granule length L of less than 3.5 mm is decreased, the size of each of most of the plurality of granular matters 10a can be made larger than the size (width a: 2.3 to 2.7 mm) of the plurality of hole parts 41 in the bottom surface part 40. Thus, the clogging of the litter 10 in the plurality of hole parts 41 can be suppressed.

In addition, the proportion (by number) of the granular matters 10a having any larger one of the granule diameter D or the granule length L of less than 3.2 mm may be 6% or less (or may be 3% or less). In this manner, as the proportion of the number of granular matters having any larger one of the granule diameter D or the granule length L of less than 3.2 mm is decreased, the size of each of most of the plurality of granular matters 10a can be made larger than the size of the plurality of hole parts 41 of the bottom surface part 40, making it possible to suppress the occurrence of clogging of the litter 10 in the plurality of hole parts 41.

A method of measuring (calculating) the number distribution of granule lengths in the granular matters of the litter is as follows. It should be noted that, in one or more embodiments, since the granular matters have a cylindrical shape having substantially the same diameter, the number distribution of the granule diameters is not measured.

<Number Distribution of Granule Lengths>
(1) The granule diameters (diameters) of a plurality of granular matters to be evaluated are measured one by one using a caliper, and the average value per 100 granular matters is defined as an average granule diameter of the granular matters.
(2) The plurality of granular matters to be evaluated are placed on a scanner so that the granular matters do not come into contact with each other. Since the granular matters have a cylindrical shape, the granular matters are placed in the state where they are laid down.
(3) Scanned images of the plurality of granular matters are captured.
(4) The scanned images are binarized by software and the areas of consecutive regions are calculated as one granular matter, one by one, in a state where the granular matters are laid down.
(5) Each granule length is calculated by software, using the average granule diameter obtained in (1) above as the granule diameter. It should be noted that the granule length is defined as a length at the position of the center of the granule diameter.
(6) Granule lengths are classified based on the granule length of each of the plurality of granular matters obtained. For example, the classification is performed in which classes are set for every 0.5 mm (examples: 0 to 0.5 mm, 0.5 to 1.0 mm, and the like).

It should be noted that the scanner is not particularly limited, and examples thereof include a general printer. The software is not particularly limited, and examples thereof include "ImageJ" of free software.

A method of measuring the clogging into the hole part of the duckboard portion with regard to the granular matters of the litter is as follows.

<Clogging>
(1) A cylindrical container having an inner diameter of 100 mm× a height of 30 mm is arranged on a thin-plate member in which the duckboard portion having rectangular hole parts (through holes) of 2.7 mm×8 mm are arranged in a grid-like manner at gaps of 2 mm so as not to protrude from the duckboard portion of the thin-plate member in a plan view.
(2) A plurality of granular matters to be evaluated (having a granule length of 6 mm or less) are laid on the thin-plate member in the cylindrical container so as to have a thickness of 2 cm.
(3) The thin-plate member on which the granular matters and the cylindrical container are placed is installed on a sieve shaking machine, and shaken under the following conditions: a shaking width: 1.8 mm, a shaking rate: 60 Hz, and a shaking time: 1 minute. As the sieve shaking machine, AS-200 manufactured by Retsch is used.
(4) After completion of the shaking, the thin-plate member is taken out from the sieve shaking machine and tilted by about 90 degrees on the pad. Thus, the number, the granule diameter, and the granule length of the granular matters that remain fitted into the hole parts in the thin-plate member are confirmed. In a case where the number of the granular matters that are fitted to the hole part is 5 or more, it is determined that the granular matters to be evaluated are easily fitted to the hole parts (easily clogged), and in a case where the number of the granular matters is less than 5, it is determined that the granular matters to be evaluated are not likely to be fitted to the hole parts (not likely to be clogged).

A method of measuring the accustomization of cats to the granular matters of the litter is as follows.

<Accustomization of Cats>
(1) Two identical system litter boxes A and B are prepared. The litter A of one or more embodiments is laid on the system litter box A and the litter B to be compared is laid on the system litter box B.
(2) On the first day and the second day among four measurement days, the system litter box A is arranged at a relatively front position in an excrement room and the system litter box B is arranged at a back position. On the third day and the fourth day, the system litter box B is arranged at an opposite position, that is, a position relatively front in the excrement room and the system litter box A is arranged at a back position.
(3) In the measurement, excrement of two cats is captured, and it is confirmed from the captured images which system litter box the two cats have excreted in. In a case where the cats have excreted in specific litter in 60% or more of a plurality of times of excrement, it is determined that the litter is the one providing high accustomization.

The proportion (by number) of the granular matters 10a having a granule length L of 3.5 to 10 mm in the plurality of granular matters 10a may be 85% or more, may be 90% or more, or may be 95% or more.

In this manner, the granule length L of a large proportion (85% or more) of the granular matters 10a has a size of 10 mm or less. That is, the plurality of granular matters 10a include almost no excessively large granular matters, and therefore, have a size providing high accustomization for cats. Therefore, the system litter box 1 using the litter 10 can make it easier for cats to excrete. At the same time, the granule length L of a large proportion (85% or more) of the granular matters 10a has a size of 3.5 mm or more. That is, since the plurality of granular matters 10a include almost no excessively small granular matter, and therefore, are larger than the plurality of hole parts 41 of the duckboard portion of the system litter box 1. Therefore, in the system litter box 1 using the litter 10, the litter 10 can be even less likely to be fitted into the plurality of hole parts 41 of the duckboard portion, making it possible to suppress the clogging.

From a similar viewpoint, the proportion (by number) of the granular matters 10a having a granule length L of 3.5 to 7.5 mm may be 75% or more, the proportion (by number) of the granular matters 10a having a granule length L of 3.5 to 6.5 mm may be 50% or more, and the proportion (by number) of the granular matters 10a having a granule length L of 6.5 mm or less may be 50% or more.

The proportion (by number) of the granular matters 10a having a granule diameter D of 3.2 to 5.0 mm in the plurality of granular matters 10a may be 85% or more, may be 90% or more, or may be 95% or more.

In this manner, the granule diameter D of a large proportion (85% or more) of the granular matters 10a has a size of 5.0 mm or less. That is, the plurality of granular matters 10a include almost no excessively large granular matters, and therefore, have a size providing high accustomization for cats. Therefore, the system litter box 1 using the litter 10 can make it easier for cats to excrete. At the same time, the granule diameter D of a large proportion (85% or more) of the granular matters 10a has a size of 3.2 mm or more. That is, since the plurality of granular matters 10a include almost no excessively small granular matter, and therefore, are larger than the plurality of hole parts 41 of the duckboard portion of the system litter box 1. Therefore, in the system litter box 1 using the litter 10, the litter 10 can be even less likely to be fitted into the plurality of hole parts 41 of the duckboard portion, making it possible to suppress the clogging.

The apparent specific gravity of the plurality of granular matters 10a may be 1.00 to 1.50 g/cm$^3$, may be 1.00 to 1.30 g/cm$^3$, or may be 1.10 to 1.30 g/cm$^3$.

In this manner, the apparent specific gravity of the plurality of granular matters 10a (litter 10) is 1.00 to 1.50 g/cm$^3$ and becomes close to the apparent specific gravity of sand providing high accustomization for cats. Therefore, the system litter box 1 using the litter 10 can make it easier for cats to excrete. At that time, the apparent specific gravity is high, which can make it less likely for the litter 10 to scatter outside the system litter box 1. Therefore, cats can appropriately excrete in the system litter box 1 and the surroundings of the system litter box 1 can be maintained in a sanitary state.

A method of calculating the apparent specific gravity of the granular matters in the litter is as follows.

<Apparent Specific Gravity>
(1) The granule diameters (diameters) of 100 granular matters are measured one by one using a caliper and an average value per 100 granular matters is used as the granule diameter.
(2) The longest direction lengths in the direction perpendicular to the granule diameters (diameters) in the 100 granular matters are measured one by one using a caliper.
(3) The mass of the 100 granular matters are measured one by one using a mass meter.
(4) Based on the measured granule diameters, granule lengths, and mass of the granular matters, the apparent specific gravity is calculated using the following expression.

$$\text{Apparent specific gravity} = (\text{Mass of granular matter})/[\pi \cdot \{(\text{granule diameter of granular matter})/2\}^2 \cdot (\text{granule length of granular matter})]$$

The calculated average value of the apparent specific gravities of the 100 granular matters is defined as a final apparent specific gravity.

The proportion (by number) of the granular matters having a mass per granule of 0.065 g or more in the plurality of granular matters 10a may be 55% or more, may be 60% or more, or may be 70% or more.

In this manner, the mass per granule of a large proportion (55% or more) of the granular matters 10a is 0.065 g or more and becomes close to the mass of sand providing high accustomization for cats. Therefore, the system litter box 1 using the litter 10 can make it easier for cats to excrete. In addition, the mass per granule is relatively large, which can make it less likely for the litter 10 to scatter outside the system litter box 1. Therefore, cats can appropriately excrete in the system litter box 1 and the surroundings of the system litter box 1 can be maintained in a sanitary state.

From a similar viewpoint, the proportion (by number) of the granular matters having a mass per granule of 0.060 to 0.10 g in the plurality of granular matters 10a may be 60% or more, may be 65% or more, or may be 70% or more. In particular, since the mass per granule of many granular matters 10a is 0.10 g or less, the granular matters are not too large and are close to the mass of sand providing high accustomization for cats, and thus, the cats can more easily excrete.

From a similar viewpoint, the average mass per granule of the plurality of granular matters 10a may be 0.08 to 0.095 g, or may be 0.085 to 0.095 g. Therefore, the mass can be set to a mass which is close to the mass of sand providing high accustomization for cats and is so heavy that the litter is not easily scattered outside the system litter box 1.

A method of measuring the number distribution of the mass of the granular matter is as follows.

<Number Distribution of Mass>
(1) The granule diameters (diameters) of 100 granular matters are measured one by one using a caliper and an average value per 100 granular matters is used as the granule diameter.
(2) The longest direction lengths in the direction perpendicular to the granule diameters (diameters) in a plurality of granular matters are measured one by one using a caliper.
(3) The volume of each of the plurality of granular matters is calculated from the measured granule diameter and granule length and multiplied by the apparent specific gravity calculated by <Apparent Specific Gravity> above to calculate the mass of each of the plurality of granular matters.
(4) Mass of the granular matters is classified based on the calculated mass of the plurality of granular matters. For example, the classification is performed in which classes are set for every 0.005 g (examples: 0 to 0.005 g, 0.005 to 0.010 g, and the like).

The gap rate between the granular matters 10a in the plurality of granular matters 10a may be 45% by volume or less. In this manner, in the litter 10, the subduction of the litter 10 when a cat steps on the litter 10 is decreased by decreasing the gap rate between the granular matters 10a to 45% by volume or less. Thus, the feeling of the litter becomes close to that of sand, leading to a state providing high accustomization for cats. Therefore, the system litter box 1 using the litter 10 can make it easier for cats to excrete. In addition, the plurality of granular matters 10a can be less likely to move relative to each other by decreasing the gaps. Thus, it is possible to prevent a situation where the granular matters move relative to each other and thus fill the gaps to hinder the urine from moving downward through the gaps. Due to that, a situation where excrement accumulates between the granular matters, and urine odor and feces odor become strong can be prevented.

A method of measuring the gap rate is as follows.

<Gap Rate>
(1) Granular matters in a wet state are put up to a scale line of 110 cc in a measuring cylinder (a 200 ml measuring cylinder manufactured by Arrow Co., Ltd. (part number 6-231-07)).
(2) Water is put up to a scale line of 100 cc in the measuring cylinder.
(3) The granular matters and water in the measuring cylinder are poured into a colander and the amount of water which has fallen down from the colander is measured. The volume thereof is defined as a gap rate (% by volume).

The angle of repose in the plurality of granular matters 10a may be 50 degrees or less. In this manner, in the litter 10, since the angle of repose in the plurality of granular matters 10a is as small as 50 degrees or less, subduction when a cat steps on the litter 10 is decreased. Thus, the feeling of the litter can become close to that of sand, leading to a state providing high accustomization for cats. Therefore, the system litter box 1 using the litter 10 can make it easier for cats to excrete. In addition, the decrease in angle of repose makes it possible to easily cover the entire feces with the granular matters 10a and can suppress the dispersion of the feces odor. From a similar viewpoint, the angle of repose in the plurality of granular matters 10a may be 40 to 48 degrees, or may be 42 to 47 degrees. In a case where the lower limit is set to 40 degrees or more, an excessive decrease in subduction when cats steps on the litter 10 can be suppressed.

A method of measuring the angle of repose is as follows.

<Angle of Repose>
(1) 100 g of granular matters are prepared.
(2) The granular matters are dropped on the bottom surface (plane) of a stainless-steel pad from a height of 4 cm, thereby forming a pile of the granular matters.
(3) An angle between the inclined surface of the pile of the granular matters and the bottom surface is measured and defined as an angle of repose.

The water absorption ratio in the plurality of granular matters 10a may be less than 160%, may be less than 130%, or may be less than 125%. In this manner, in the litter 10, by decreasing the water absorption ratio of the granular matters 10a to less than 160%, the granular matters 10a are suppressed from swelling by absorbing urine and the deviation from the state of the sand is suppressed. Accordingly, a state providing high accustomization for cats can be maintained. Therefore, the system litter box 1 using the litter 10 can make it easier for cats to excrete. In addition, by decreasing the water absorption ratio, it is possible to prevent a situation where the granular matters 10a retain urine and the urine generates a bad odor or a harmful substance due to an influence of microorganisms or the like even in a case where the litter 10 is used for a long period of time.

A method of measuring the water absorption ratio is as follows.

<Water Absorption Ratio>
(1) 100 g (weight before water absorption) of a plurality of granular matters are put in a container.
(2) Water is poured into the container so that the plurality of granular matters are sufficiently immersed, and left to stand for 10 minutes.
(3) The plurality of granular matters are transferred to a colander to cut off water and then evenly spread on a pet sheet, and the surface is wiped and then left to stand for 5 minutes.
(4) After leaving it to stand, the weight (weight after water absorption) is measured.
(5) The water absorption ratio (%) is calculated by the following expression.

Water absorption ratio (%)=(Weight after water absorption)/(Weight before water absorption)× 100

The disintegrability of each of the plurality of granular matters 10a may be less than 0.5 mL, may be less than 0.3 mL, or may be less than 0.1 mL. In this manner, in the litter 10, the disintegrability of each of the plurality of granular matters 10a can be lowered to less than 0.5 mL to make it less likely for the granular matters 10a to disintegrate after absorbing urine. This can make it possible to suppress the granular matters 10a from disintegrating and being thus fitted into a plurality of hole parts 41 in the duckboard portion of the litter box 1.

A method of measuring the disintegrability is as follows.

<Disintegrability>
(1) Granular matters of litter having an initial mass of 100 g are prepared and put in a container. It should be noted that granular matters not passing through a sieve having an opening of 2 mm are used.
(2) Water is poured into the container so that the granular matters are sufficiently immersed, and left to stand for 5 minutes.
(3) The granular matters are evenly spread on a pet sheet and left to stand for 10 minutes.
(4) The granular matters after being left to stand are put onto a sieve having an opening of 2 mm and shaken by the sieve shaking machine under the conditions that a shaking width is 3 mm, a shaking speed is 60 Hz, and a shaking time is 5 minutes. As a sieve shaking machine, AS-200 manufactured by Retsch GmbH was used.
(5) The volume of the granular matters in a size of 2 mm or less which have passed the sieve is measured in a measuring cylinder.

A surface roughness of each of the plurality of granular matters 10a is relatively small, and the degree of unevenness is close to the unevenness when sand is relatively compressed. Therefore, the litter 10 can be brought into a state providing high accustomization for cats. Due to that, in the system litter box 1 using the litter 10, cats can excrete more easily.

The granular matters 10a of the litter 10 of one or more embodiments may include a base material and a water-cut-off covering layer.

The base material may include an odor-adsorbing material capable of absorbing the odor of urine and feces excreted by cats, and the base material may include a solidifying agent that integrally fixes the odor-adsorbing material.

In this manner, in the litter 10, the diffusion of the odors of urine and feces excreted by cats can be suppressed by incorporating the odor-adsorbing material into the base material, correspondingly the granular matters 10a. Due to that, even in a case where the litter 10 is used for a long period of time, the litter 10 is brought close to the state of the original sand without excrement or an odor thereof, providing high accustomization for cats. Due to that, in the system litter box 1 using the litter 10, cats can excrete more easily.

The odor-adsorbing material may include a porous material, and may include an inorganic porous material. Examples of the inorganic porous material include natural minerals (for example, zeolite, sepiolite, attapulgite, diatomaceous earth, and diatomaceous shale), artificial zeolites, silica gel, or combinations of at least two thereof. Since the inorganic porous material has a property of adsorbing an odor such as ammonia, constitution of a granular matter mainly consisting of granules of the inorganic porous material makes it possible to obtain litter having excellent deodorization performance. In this manner, the composition of the granular matters 10a can become close to the composition of the sand by incorporating an inorganic porous material into the odor-adsorbing material, thus leading to a state providing high accustomization for cats. Therefore, the system litter box 1 using the litter 10 can make it easier for cats to excrete.

From the viewpoint of increasing the strength of the granular matters 10a of the litter 10, the granules of the inorganic porous material may have a small average granule diameter. Examples of the average granule diameter of the granules of the inorganic porous material include 300 µm or less. The content of the inorganic porous material in the base material of the granular matters 10a may be 50 mass % to 95 mass %. In a case where the content of the inorganic porous material in the base material is less than 50 mass %, there is a risk that the deodorization effect of the granular matters 10a is reduced, and in a case where the content is more than 95 mass %, there is a risk that the granular matters 10a cannot obtain a sufficient strength.

Examples of the solidifying agent include an inorganic solidifying agent and an organic solidifying agent, and from the viewpoint of obtaining a sufficient strength of the granular matters 10a, the solidifying agent may be the inorganic solidifying agent. Examples of the inorganic solidifying agent include a cement and a non-cement-based solidifying agent. The cement is a solidifying agent containing calcium silicate as a main component and reacting (hydrating) with water to cure. Examples of the cement include a portland cement and a white cement. The non-cement-based solidifying agent is a solidifying agent other than the cement, that is, a solidifying agent that does not contain calcium silicate as a main component. Examples of the non-cement-based solidifying agent include dolomite, calcium oxide, calcium sulfate, and magnesium oxide. Among those, a mixture of a water-curable solidifying agent containing calcium sulfate and magnesium oxide as main components, which is the non-cement-based solidifying agent, and the cement may be used as the inorganic solidifying agent. Use of such a mixture as the inorganic solidifying agent makes it possible to increase the strength of the granular matters and to suppress an increase in pH of the granular matters due to the use of the cement. By suppressing the increase in pH of the granular matters, the generation of ammonia from urine can be suppressed. The content of the solidifying agent in the base material of the granular matters 10a may be 5 mass % to 30 mass %. In a case where the total content of the solidifying agent is less than 5 mass %, there is a risk that the granular matters cannot obtain a sufficient strength, and in a case where the total content is more than 30 mass %, there is a risk that the deodorization effect of the granular matters is reduced. In a case where the inorganic solidifying agent is used, the content of the non-cement-based solidifying agent in the inorganic solidifying agent may be 20 mass % or more. In a case where the content of the non-cement-based solidifying agent is less than 20 mass %, there is a risk that the pH of the granular matters is not sufficiently low.

Further, in addition to granules of the inorganic porous material and the inorganic solidifying agent, a pozzolan material may be added to the base material. The pozzolan material is a generic term for a fine powder containing silica as a main component, and is a material that reacts with calcium hydroxide to produce an insoluble and stable calcium silicate hydrate. Examples of such a pozzolan material include silica gel, diatomaceous earth, and diatomaceous shale. The addition of these pozzolan materials makes it possible to further decrease the pH of the granular matters.

The water-cut-off covering layer is formed on the surface of the base material, and is formed of a water-cut-off agent that has water absorption as well as viscosity in a water-absorbent state. By allowing the water-cut-off covering layer to be formed on the surface of the base material of the granular matters 10a, the granular matters 10a becomes excellent in liquid permeability. That is, due to the presence of the water-cut-off covering layer on the surface of the base material, most of the liquid excreted during urination or the like of animals passes between the granular matters 10a without being absorbed by the litter 10. However, the liquid that remains on the surface of the granular matters 10a is absorbed by the water-cut-off agent and taken into the base material over time. Further, by allowing the granules of the inorganic porous material to be bound to each other by the water-cut-off agent in the water-cut-off covering layer formed on the surface of the base material, the generation of dust from the litter can be prevented. Examples of the water-cut-off agent include an ethylene-vinyl acetate copolymer (EVA), polyvinyl alcohol (PVA), starch, persimmon tannin, pine tar, gelatin, and a combination of at least two thereof. The water-cut-off agent may include an ethylene-vinyl acetate copolymer. The water-cut-off covering layer may cover 70% or more of the surface of the base material, or may cover 90% or more of the surface of the base material. In a case where the water-cut-off covering layer covers 90% or more of the surface of the base material, the litter exhibits good liquid permeability. The thickness of the water-cut-off covering layer may be 0.1 to 300 µm, or may be 1 to 100 µm. In a case where the thickness of the water-cut-off covering layer is less than 0.1 µm, the water-cut-off covering layer is likely to peel off or melt and disappear during the use of the litter. In a case where the thickness of the water-cut-off covering layer is more than 300 µm, the liquid attached to the surface of the granular matter is less likely to be taken into the base material.

Next, a method of producing the litter 10 according to one or more embodiments will be described.

(1) Mixing Step

In one or more embodiments, a base material that constitutes the granular matters 10a is granulated from a mixture including an inorganic porous material and a solidifying agent. For this purpose, first, the inorganic porous material and the solidifying agent are mixed at a predetermined proportion, and then water is added thereto, followed by uniform stirring and mixing so as not to generate lumps in a mixer or the like.

(2) Granulating Step

Then, the base material is granulated using the obtained mixture. For example, using any of various granulating devices for powder, such as a disk pelletizer, a briquette machine, or a tableting machine, the obtained mixture is granulated into a base material having a predetermined shape and a predetermined size.

(3) Curing Step

Next, the obtained base material is left for a predetermined time for the solidification of the solidifying agent. The predetermined time (curing time) varies depending on an air temperature, but from the viewpoint of sufficiently solidifying a cement, the curing may be performed for 72 hours or longer.

(4) Drying Step

Then, the sufficiently solidified base material is dried in a dryer. This drying is performed, for example, using a rotary kiln dryer. The drying may be performed in a manner such that the moisture content of the base material is 10% or less. To measure the moisture content, the dried base material is dried again for 24 hours at 110° C., the difference in the mass of the base material before and after the re-drying is defined as a moisture content of the base material, and the moisture content is divided by the mass of the granular matters before the re-drying.

(5) Covering Step

Next, the dried base material is covered with a water-cut-off agent to form a water-cut-off covering layer. The water-cut-off agent is dissolved or dispersed in water in advance, and a solution or dispersion of the water-cut-off agent is sprayed onto the base material. In a case where the dried base material is in a state of 80° C. to 100° C., a solution or dispersion of the water-cut-off agent is sprayed on the spray, the blown moisture is evaporated to form a water-cut-off covering layer on the surface of the base material. Due to that, the base material covered with the water-cut-off covering layer, that is, second granular matters are generated.

(6) Sieving Step

Large and small granular matters are removed from the second granular matters by a sieving step using a sieve having a predetermined mesh width, thereby obtaining the first granular matters having a predetermined size, that is, the granular matters 10a.

Due to that, the litter 10 is produced.

Here, the (1) mixing step to the (5) covering step can be referred to as a forming step of forming the second granular matters (having the same configuration as the first granular matters but having a different granule diameter (granule length) distribution). In addition, the (6) sieving step can be referred to as an acquisition step of acquiring the first granular matters (granular matters 10a).

As one or more embodiments, the granular matters 10a of the litter 10 may include a ground product of a plant-derived material, a synthetic resin, and a water-insoluble inorganic material.

Examples of a ground product of the plant-derived material include ground products derived from wood and herbs, for example, wood flour (ground products of wood or bark), seed oil residues, grain skin ground products, and herb ground products. From the viewpoint of enhancing the moldability and the deodorizing property of the granular matters, wood flour derived from coniferous trees such as Cedaraceae, Pinaceae, or Cypressaceae may be used at 60 mass % or more, and wood flour derived from broad-leaved trees such as Fagaceae, Elmaceae, or Betulaceae is used at 40 mass % or less. Examples of the shape of the ground product of the plant-derived material include a powdery shape, a granular shape, a needle-like shape, a plate-like shape, or an aggregate thereof, but from the viewpoint of the moldability and the handling, the shape of the ground product of the plant-derived material may be the powdery shape. From the viewpoint of maintaining the deodorization effect and generating an aroma peculiar to the plant-derived material, the content of the ground product of the plant-derived material in one or more embodiments may be 70.0 mass % or more.

As the synthetic resin, a thermoplastic resin may be used from the viewpoint of enhancing the shape retention property of the granular matters. Examples of the thermoplastic resin include polyolefins such as polyethylene and polypropylene, polyesters such as polyethylene terephthalate, vinyl-based resins such as polyamide, polyvinyl chloride, and polystyrene, acrylic resins such as polyacrylic acid and polymethyl methacrylate, an ethylene-propylene copolymer, polyvinyl acetate, an ethylene-vinyl acetate copolymer (EVA), and a polyvinyl alcohol. These synthetic resins may be used alone or in combination. From the viewpoint of increasing the mixing property of the ground product of the plant-derived material, at least one of polypropylene and the ethylene-vinyl acetate copolymer may be used. From the viewpoint of enhancing the shape retention property of the granular matters, the content of the synthetic resin may be 1.0 mass % or more.

Examples of the water-insoluble inorganic material include metal oxides and metal hydroxides, for example, calcium carbonate, calcium oxide, calcium hydroxide, aluminum hydroxide, aluminum oxide, zinc oxide, titanium oxide, magnesium hydroxide, magnesium oxide, and magnesium carbonate. These may be used alone or in combination. The water-insoluble inorganic material may include, among those, at least anyone of zinc oxide and titanium oxide. The deodorization effect on excrement can be enhanced by including the water-insoluble inorganic material. The shape of the water-insoluble inorganic material can be a granular shape, a needle-like shape, a plate-like shape, a columnar shape, a lumpy shape, or the like, or a combination thereof. In addition, the water-insoluble inorganic material may be crystalline or amorphous. From the viewpoint of handleability, the shape of the water-insoluble inorganic material may be the granular shape. The content of the water-insoluble inorganic material may be 0.1 mass % or more.

Next, a method of producing the litter 10 according to one or more embodiments will be described.

(1) Mixing Step

First, a mixture is prepared by thoroughly mixing a ground product of a plant-derived material, a synthetic resin, and a water-insoluble inorganic material in a predetermined proportion. It should be noted that the synthetic resin may be mixed as a solid such as powder and granules, and may be mixed in a pre-melted state. The mixing step can be performed using a mixer such as a paddle mixer.

(2) Molding Step

Then, the obtained mixture is used to form granular matters. For example, using various extruders such as a pelletizer and an extruder, the obtained mixture is molded into granular matters having a predetermined size and a predetermined shape. Due to that, second granular matters are generated.

(3) Sieving Step

Large and small granular matters are removed from the second granular matters by a sieving step using a sieve having a predetermined mesh width, thereby obtaining the first granular matters having a predetermined size, that is, the granular matters 10a.

Due to that, the litter 10 is produced.

Here, the (1) mixing step and the (2) molding step can be referred to as a forming step of forming the second granular matters (having the same configuration as the first granular matters but having a different granule diameter (granule length) distribution). In addition, the (3) sieving step can be referred to as an obtaining step of obtaining the first granular matters (granular matters 10a).

EXAMPLES

Hereinafter, the present invention will be more specifically described by exemplifying examples and comparative examples, but the present invention is not limited only to such examples.

(A) Sample (A-1) Examples 1 and 3, and Comparative Example 2

(1) Mixing Step 75 parts by mass of zeolite, 20 parts by mass of a cement, and 5 parts by mass of silica gel were mixed, 40 parts by mass of water was further added thereto, and the mixture was stirred and mixed with a Loedige mixer.

(2) Granulating Step

The stirred and mixed mixture was compressed and granulated in a disk pelletizer (manufactured by Dalton Corporation). The opening dimensions of the outlet of the disk were as follows: a diameter of 3.5 mm (Example 1) or 5.5 mm (Example 3 and Comparative Example 2), a thickness of the disk of 35 mm, and an effective length of 12 mm. The obtained base material had a cylindrical shape with a granule diameter of 3.5 mm (Example 1) or 5.5 mm (Example 3 and Comparative Example 2) and a granule length of 25 mm.

(3) Curing Step

The obtained base material was left to stand at room temperature of 20° C. for 72 hours, and the solidification of the cement and the like progressed.

(4) Drying Step

The base material that had been subjected to the curing step was dried using a rotary kiln dryer until the finished moisture content was 10% or less. In the drying step, contraction of a part of the granular matters and folding of a part of the granular matters occurred. Due to that, the base material obtained after the drying step had a granule diameter of 3.5 mm (Example 1) or 5.5 mm (Example 3 and Comparative Example 2) and an average granule length of 9 mm.

(5) Covering Step

EVA was used as the water-cut-off agent. A dispersion obtained by dispersing a water-cut-off agent in water having a mass of 10 times was applied at a content of 5 mass % based on the mass of the base material. The application was performed by spraying the dispersion of the water-cut-off agent, in which the base material obtained after the drying step was at a high temperature (100° C.), while the base material was stirred and mixed.

(6) Sieving Step

The obtained granular matters were first sieved through a sieve having an opening of 10 mm×10 mm to remove the granular matters having a size larger than a predetermined size. Subsequently, the opening was gradually reduced according to each of Example 1, Example 3, and Comparative Example 2 to gradually remove the granular matters having a size smaller than the predetermined size. Then, granular matters having a size in a predetermined range were obtained. Thus, litter of Example 1, Example 3, and Comparative Example 2 was obtained.

(A-2) Example 2 and Comparative Example 1

(1) Mixing Step 80 parts by mass of wood powder as a ground product of the plant-derived material, 10 parts by mass of an ethylene-vinyl acetate copolymer as a synthetic resin, and 1 part by mass of calcium carbonate as a water-insoluble inorganic material were stirred and mixed with each other using a Loedige mixer.

(2) Molding Step

The stirred mixture was granulated using a die having an expelling port having a pore diameter of 3.5 mm (Example 2) or 6.0 mm (Comparative Example 1) and a thickness of 40 mm, and a pelletizer (manufactured by Dalton Corporation) to form granular matters. The obtained granular matters were cylindrical, and had a cylindrical shape with a granule diameter of 3.5 mm (Example 2) or 6.0 mm (Comparative Example 1) and an average granule length of 10 mm.

(3) Sieving Step

The obtained granular matters were first sieved through a sieve having an opening of 10 mm×10 mm to remove the granular matters having a size larger than a predetermined size. Subsequently, the opening was gradually reduced corresponding to each of Example 2 and Comparative Example 1 to gradually remove the granular matters having a size smaller than the predetermined size. Then, granular matters having a size in a predetermined range were obtained. Thus, litter of Example 2 and Comparative example 1 was obtained.

(B) Evaluation

For at least one of Examples 1 to 3 and at least one of Comparative Examples 1 and 2, the granule diameter, the granule length, and the mass of the granular matters, and the number distributions thereof, the accustomization of cats, the apparent specific gravity, the gap rate, the angle of repose, the water absorption ratio, and the disintegrability were evaluated. Each measurement method (calculation method) therefor is as described above.

(C) Results (C-1) Number Distribution of Granule Lengths

In the granular matters of Examples 1, 2, and 3, and Comparative Examples 1 and 2, since the granule diameters are substantially constant at 3.5 mm, 3.5 mm, 5.5 mm, 3.5 mm, and 5.5 mm, respectively, only the number distribution of the granule lengths was evaluated (the number distribution of the granule diameters was not evaluated).

Due to that, the proportions (% by number) of the granular matters having a granule length of less than 3.2 mm were each 0.57%, 5.16%, and 0.60%, that is, 6% or less in Examples 1 to 3. On the other hand, in Comparative Examples 1 and 2, the proportions were each 8.18% and 13.0%, that is, more than 6%. In addition, the proportions (% by number) of the granular matters having a granule length of 3.5 to 10 mm were each 98.6%, 94.8%, and 87.4%, that is, 85% or more in Examples 1 to 3. On the other hand, in Comparative Examples 1 and 2, the proportions were each 79.3% and 75.1%, that is, less than 85%.

(C-2) Clogging

In evaluation of the clogging of the granular matters for Examples 1, 2, and 3, and Comparative Examples 1 and 2, it was revealed that Examples 1, 2, and 3 were all evaluated as having 1 clogged hole (less than 5 clogged holes), indicating that they were even less likely to be fitted into the hole part (less likely to be clogged). It was revealed that Comparative Examples 1 and 2 were both evaluated as having 5 clogged holes (5 or more clogged holes), indicating that they were easily fitted into the hole parts (easily clogged).

(C-3) Accustomization of Cats

With regard to the accustomization of cats to litter, Example 1 and Comparative Example 2 were compared. Two cats excreted a total of 32 times (17 times and 15 times) over a four-day period, but excreted 26 times in the litter of Example 1 (81%) and excreted 6 times in the litter of Comparative Example 2 (19%). Therefore, it was revealed that the litter of Example 1 had high accustomization (OK), and the litter of Comparative Example 2 had low accustomization (NG).

In addition, with regard to the accustomization of cats, Example 3 and Comparative Example 1 were compared. Two cats excreted a total of 18 times (8 times and 10 times) over a four-day period, but excreted 11 times in the litter of Example 3 (61%), and excreted 7 times in the litter of Comparative Example 1 (39%). Therefore, it was revealed that the litter of Example 3 had high accustomization (OK) and the litter of Comparative Example 1 had low accustomization (NG).

In addition, with regard to the accustomization of cats, Example 2 and Comparative Example 2 were compared. Two cats excreted a total of 26 times (19 times and 7 times) over a four-day period, but excreted 19 times in the litter of Example 2 (73%) and excreted 7 times in the litter of Comparative Example 2 (27%). Therefore, it was revealed that the litter of Example 2 had high accustomization (OK) and the litter of Comparative Example 2 had low accustomization (NG).

(C-4) Brief Summary 1

The results thus far are shown in Table 1.

TABLE 1

|  | Example 1 | Example 2 | Example 3 | Comparative Example 1 | Comparative Example 2 |
|---|---|---|---|---|---|
| Proportion (% by number) of granular matters having granule length of less than 3.2 mm | 0.57 | 5.16 | 0.60 | 8.18 | 13.0 |
| Proportion (% by number) of granular matters having granule length of 3.5 to 10 mm | 98.6 | 94.8 | 87.4 | 79.3 | 75.1 |
| Clogging (number of clogged holes) | 1 | 1 | 1 | 5 | 5 |
| Accustomization of cats | OK | OK | OK | NG | NG |

(C-5) Apparent Specific Gravity

The apparent specific gravities of the granular matters were determined for Examples 1, 2, and 3, and Comparative Examples 1 and 2. As a result, the apparent specific gravities were each 1.28 g/cm$^3$, 1.06 g/cm$^3$, 1.28 g/cm$^3$, 0.95 g/cm$^3$, and 1.26 g/cm$^3$, and for at least Examples 1 to 3, the apparent specific gravities were 1.00 to 1.50 g/cm$^3$.

(C-6) Mass Per Granule

The proportions (by number) of granular matters having a mass per granule of 0.065 g or more were determined for Examples 1, 2, and 3, and Comparative Examples 1 and 2. As a result, the proportions were 78.8%, 57.0%, 100%, 40.2%, and 97.9%, respectively, and for at least Examples 1 to 3, the proportions (by number) of the granular matters having a mass per granule of 0.065 g or more were 55% or more.

The proportions (by number) of the granular matters having a mass per granule of 0.060 to 0.10 g were determined for Examples 1, 2, and 3, and Comparative Examples 1 and 2. As a result, the proportions were 74.4%, 66.9%, 8.39%, 54.3%, and 0.57%, respectively, and for at least Examples 1 and 2, the proportions (by number) of the granular matters having a mass per granule of 0.060 to 0.10 g were 60% or more.

In addition, for Example 1 and Comparative Example 1, the average mass per granule was determined. As a result, the average mass were 0.090 g and 0.079 g, respectively, and for at least Example 1, the average mass per granule was 0.080 g or more.

(C-7) Gap Rate

The gap rates were determined for Examples 1, 2, and 3, and Comparative Examples 1 and 2. Due to that, the gap rates were each 40.6% by volume, 40.7% by volume, 44.9% by volume, 43.7% by volume, and 44.9% by volume, and for at least Examples 1 to 3, the gap rates were 45% by volume or less.

(C-8) Angle of Repose

The angles of repose were determined for Examples 1, 2, and 3, and Comparative Examples 1 and 2. Due to that, the angles of repose were each 44 degrees, 47 degrees, 41 degrees, 35 degrees, and 39 degrees, and for at least Examples 1 to 3, the angles of repose were 50 degrees or less and 40 to 48 degrees.

(C-9) Water Absorption Ratio

The water absorption ratios were determined for Examples 1, 2, and 3, and Comparative Examples 1 and 2. Due to that, the water absorption rates were each 123%, 157%, 121%, 160%, and 121%, and for at least Examples 1 to 3, the water absorption ratios were less than 160%.

(C-10) Disintegrability

The disintegrabilities were determined for Examples 1, 2, and 3, and Comparative Examples 1 and 2. Due to that, the disintegrabilities were each 0 mL, 0.1 mL, 0 mL, 0.5 mL, and 0 mL, and for at least Examples 1 to 3, the disintegrabilities were less than 0.5 mL.

(C-11) Brief Summary 2

The results thus far are shown in Table 2.

TABLE 2

|  | Example 1 | Example 2 | Example 3 | Comparative Example 1 | Comparative Example 2 |
|---|---|---|---|---|---|
| Apparent specific gravity (g/cm$^3$) | 1.28 | 1.06 | 1.28 | 0.95 | 1.26 |
| Proportion (% by number) of granular matters having mass per granule of 0.065 g or more | 78.8 | 57.0 | 100 | 40.2 | 97.9 |
| Proportion (% by number) of granular matters having mass per granule of 0.06 to 0.10 g | 74.4 | 66.9 | 8.39 | 54.3 | 0.57 |
| Average mass (g) per granule | 0.090 | — | — | 0.079 | — |
| Gap rate (% by volume) | 40.6 | 40.7 | 44.9 | 43.7 | 44.9 |
| Angle of repose (degree) | 44 | 47 | 41 | 35 | 39 |
| Water absorption ratio (%) | 123 | 157 | 121 | 160 | 121 |
| Disintegrability | 0 | 0.1 | 0 | 0.5 | 0 |

The litter for a system litter box and the method of producing litter for a system litter box of the present invention are not limited to the above-described embodiments, and can be appropriately modified or combined with well-known techniques within a range not departing from the gist of the present invention. Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: system litter box
10: litter for a system litter box
10a: granular matter

What is claimed is:

1. Litter for a system litter box, comprising:
   granular matters each having a granule diameter equal to or less than 6.0 mm, wherein
   a proportion of the granular matters, having any smaller one of a granule diameter and a granule length of less than 3.2 mm, is equal to or less than 6% by number, and
   a content of a ground product of a plant-derived material in the granular matters is equal to or greater than 70.0 mass %.

2. The litter according to claim 1, wherein a proportion of the granular matters, having a granule length of 3.5 to 10 mm, inclusive, is equal to or greater than 85% by number.

3. The litter according to claim 1, wherein an apparent specific gravity of the granular matters is 1.00 to 1.50 g/cm³, inclusive.

4. The litter according to claim 1, wherein a proportion of the granular matters, having a mass per granule equal to or greater than 0.065 g, is equal to or greater than 55% by number.

5. The litter according to claim 1, wherein a gap rate between the granular matters is equal to or less than 45% by volume.

6. The litter according to claim 1, wherein an angle of repose in the granular matters is equal to or less than 50 degrees.

7. The litter according to claim 1, wherein the granular matters include an odor-adsorbing material.

8. The litter according to claim 7, wherein the odor-adsorbing material includes an inorganic porous material.

9. The litter according to claim 1, wherein a water absorption ratio in the granular matters is less than 160%.

10. The litter according to claim 1, wherein a disintegrability in each of the granular matters is less than 0.5 mL.

11. A system litter box kit comprising:
    a system litter box;
    the litter according to claim 1; and
    an excrement treatment sheet.

12. A method of producing litter for a system litter box, the method comprising:
    forming granular matters; and
    removing, from the granular matters, first granular matters having a predetermined size, wherein
    a granule diameter of each of the first granular matters is equal to or less than 6.0 mm,
    a proportion of the first granular matters, having any smaller one of a granule diameter or a granule length of less than 3.2 mm, is equal to or less than 6% by number, and
    a content of a ground product of a plant-derived material in the granular matters is equal to or more than 70.0 mass %.

* * * * *